US008078993B2

(12) United States Patent
Haitani et al.

(10) Patent No.: US 8,078,993 B2
(45) Date of Patent: Dec. 13, 2011

(54) OPERATING MULTIPLE VIEWS ON A COMPUTING DEVICE IN CONNECTION WITH A WIRELESS COMMUNICATION SESSION

(75) Inventors: Robert Haitani, Menlo Park, CA (US); Srikiran Prasad, Cupertino, CA (US); Nancy Gayed, San Francisco, CA (US); Ramachandran Venkataraman, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 756 days.

(21) Appl. No.: 11/200,510

(22) Filed: Aug. 8, 2005

(65) Prior Publication Data

US 2007/0049335 A1 Mar. 1, 2007

(51) Int. Cl.
*G06F 3/14* (2006.01)
*G06F 15/177* (2006.01)
*G06F 3/00* (2006.01)
*G06F 3/048* (2006.01)

(52) U.S. Cl. ......... 715/864; 715/737; 715/753; 715/788
(58) Field of Classification Search .................. 715/864, 715/737, 753, 788
See application file for complete search history.

(56) References Cited

U.S. PATENT DOCUMENTS

| 5,835,088 | A | * | 11/1998 | Jaaskelainen, Jr. ........... 715/803 |
| 6,018,711 | A | * | 1/2000 | French-St. George et al. .............. 704/275 |
| 6,084,951 | A | * | 7/2000 | Smith et al. ............. 379/93.17 |
| 6,442,263 | B1 | * | 8/2002 | Beaton et al. ............ 379/142.04 |
| 7,222,304 | B2 | * | 5/2007 | Beaton et al. ............. 715/744 |
| 7,295,852 | B1 | * | 11/2007 | Davis et al. .................. 455/518 |
| 2002/0187794 | A1 | | 12/2002 | Fostick et al. |
| 2003/0210260 | A1 | | 11/2003 | Palmer et al. |
| 2004/0024846 | A1 | * | 2/2004 | Randall et al. ................ 709/219 |
| 2004/0249846 | A1 | * | 12/2004 | Randall et al. ................ 707/102 |
| 2005/0131992 | A1 | | 6/2005 | Goldstein et al. |
| 2005/0285731 | A1 | * | 12/2005 | Outlaw et al. .............. 340/539.1 |
| 2006/0007189 | A1 | * | 1/2006 | Gaines et al. ................. 345/179 |
| 2006/0148526 | A1 | * | 7/2006 | Kamiya et al. ................ 455/566 |
| 2006/0168015 | A1 | * | 7/2006 | Fowler .......................... 709/206 |
| 2007/0036286 | A1 | | 2/2007 | Champlin et al. |

(Continued)

FOREIGN PATENT DOCUMENTS

EP 0611239 A1 8/1994

(Continued)

OTHER PUBLICATIONS

Adam Z. Leih, "Windows Mobile 5.0: Exposed!," Mar. 24, 2005. www.pocketnow.com/index.php?a=portal_detail&t=reviews&id=601.*

(Continued)

*Primary Examiner* — Weilun Lo
*Assistant Examiner* — Shashi Becker

(57) ABSTRACT

Embodiments described herein include a computing device that is configured to generate a multi-view presentation. The computing device may include a wireless communication application that performs at least one of transmitting and receiving data wirelessly during a communication session. The computing device may generate a view for the communication session on a corresponding display area. In one embodiment, the view occupies only a portion of the display area. At the same time the view of the communication session is provided, an embodiment provides that one or more user-interface features are provided in a portion of the display area for use with a second application. In one embodiment, these user-interface features may be provided in a region of the display that does not include the area occupied by the view.

35 Claims, 9 Drawing Sheets

U.S. PATENT DOCUMENTS

2007/0063923 A1* 3/2007 Koenig .......................... 345/1.1

FOREIGN PATENT DOCUMENTS

WO      WO 98/48550 A      10/1998
WO      WO 99/26127 A      5/1999

OTHER PUBLICATIONS

International Search Report and Written Opinion of the International Searching Authority in International Application PCT/US2006/030979, European Patent Office, Jul. 17, 2007, 11 pages.

International Search Report and Written Opinion of the International Searching Authority in International Application PCT/US2006/030827, European Patent Office, Jan. 15, 2007, 15 pages.

Internet Telephony Manager (ITM) User Guide, XP002413107, Dec. 1, 1996, pp. 1-5.

Nokia 6630 User's Guide, XP002413106, Mar. 28, 2005, pp. 1-109.

Non-Final Office Action mailed Feb. 27, 2009 in U.S. Appl. No. 11/211,511, 7 pages.

Sharma, A.K., Juneja, D., and Bishnoi, C., Intelligent Agents in Call Management System, Integration of Knowledge Intensive Multi-Agent Systems International Conference, XP010793134, Apr. 18, 2005, pp. 9-14.

* cited by examiner

OPERATING MULTIPLE VIEWS ON A COMPUTING DEVICE IN CONNECTION WITH A WIRELESS COMMUNICATION SESSION

TECHNICAL FIELD

The disclosed embodiments relate generally to the field of user-interface features for wireless computing devices, and more particularly, to a computing device that operates multiple application views for different applications in connection with a communication session.

BACKGROUND

Computing devices increasingly handle different forms of communications. In particular, devices that handle wireless telephony (e.g. cell phones) and other forms of wireless communications have become more functional. For example, wireless mobile devices enable a user to participate in a phone call while at the same time operate one or more other applications that are independent of the phone call or device communications. Users may perform tasks that include looking up contacts, playing games and activating speed dial triggers, while all the time remaining connected and participating in the call.

In many cases, the user can enter navigation and selection input to switch from viewing one application to viewing another. Thus, when the user switches away from viewing the application from which a communication session is being handled, the user has little access to viewing data from that application.

DETAILED DESCRIPTION

Figure 1:
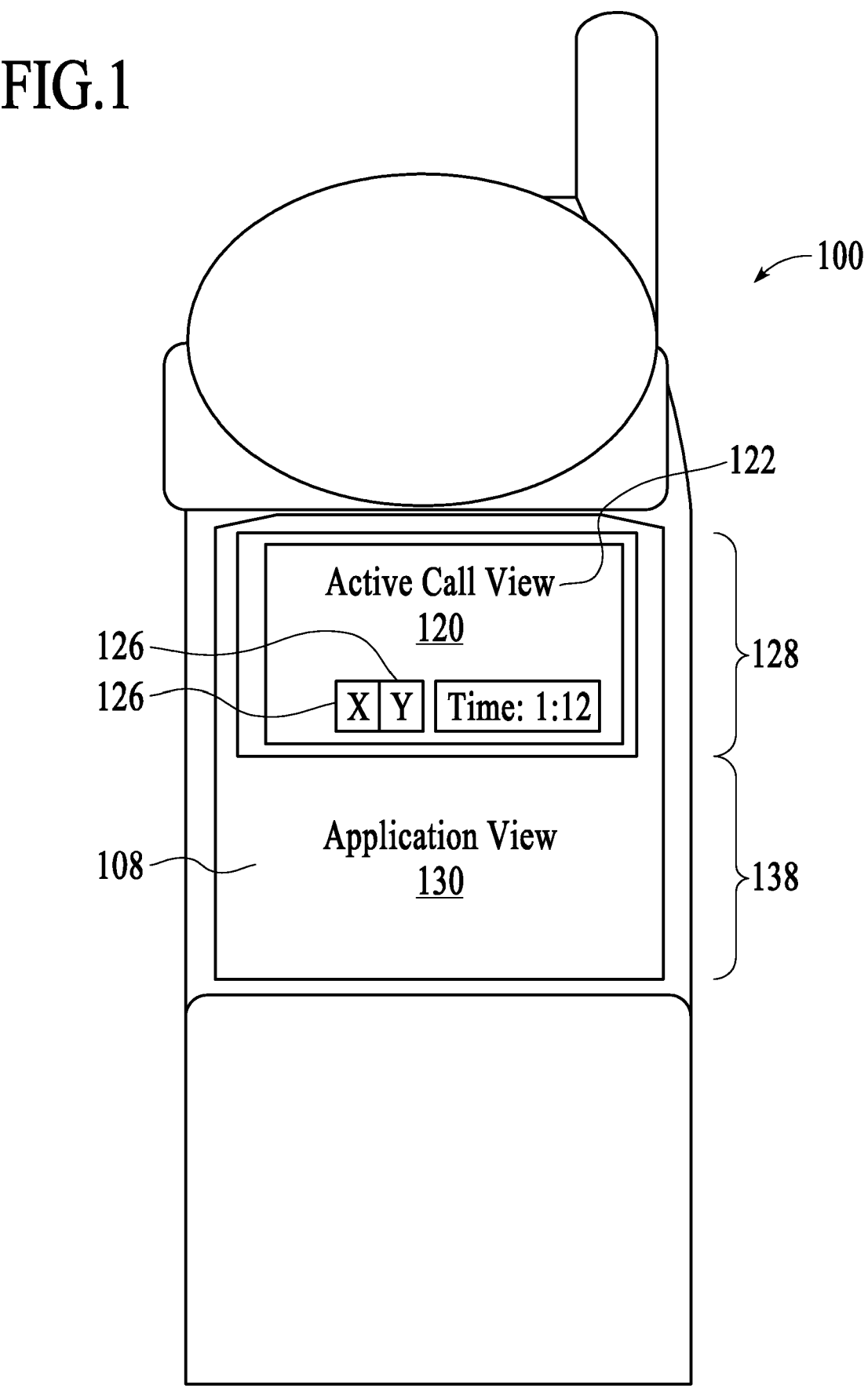
FIG. 1 illustrates a mobile computing device configured according to an embodiment of the invention.

Embodiments described herein enable multiple application views to be generated and presented at one time on a display of a computing device. In particular, embodiments described herein enable an application view for a wireless communication application to be displayed when wireless communications are ongoing, while simultaneously enabling the application view and/or user-interface features of another application to be available to the user.

Additionally, embodiments of the invention enable software for use with communication functionality to be embedded in a non-communication application, so that the communication functionality is made accessible to the user as the same time the non-communication application is executing. For example, according to one or more embodiments, a phone or messaging application may be embedded in a non-communication application, so that views generated from those communication applications may be displayed with a view of the non-communication application.

As described with many embodiments, the communication software or application may be embedded into the non-communication application through use of plug-ins and plug-in architecture. For example, the non-communication application may include application program interfaces or other programmatic interface elements to enable other communication applications to run within the framework of the non-communication application. Such plug-in architecture may have particular use on small-form factor computing devices, such as handheld phones and messaging devices, and particularly those that run "thin" applications and operating systems.

According to one or more embodiments, an active communication view may be generated from use of a plug-in or other embedded software that runs with another non-communication application. The active view may be generated for purpose of enabling the user of a computing device to interact with a wireless application. The active view may be generated while enabling the user to view and access other displayed user-interface features provided on the display. In one embodiment, the active communication view enables the user (i) to view information about a communication session, and/or (ii) to provide input for controlling an application that provides the communication session.

Additionally, an active communication view is displayed with the view and/or user-interface feature of one or more other applications, so that the user is visually aided in being able to use other applications. For example, past approaches have enabled users on mobile computing devices to conduct phone conversations using a phone application, while at the same time, enabling the user to open and use other application. In such approaches, the phone application may occupy the entire display area, unless the user selects to open another application, in which case the other application occupies the entire display area. When a user switches away from the phone application, information provided by the phone application would disappear. Thus, the user would not know, for example, that the phone call was dropped. Additionally, because the display would lose all information about the phone application and phone call, there was the possibility that the user would become disoriented or lost when navigating away from the phone application.

In contrast to these past approaches, embodiments of the invention enable the user to access both applications, and to view the operation of the communication application while switching attention between different applications.

Introduction

Embodiments described herein include a computing device that is configured to generate a multi-view presentation. The computing device may include a plug-in, wireless communication application that can be used in connection with operations of transmitting and receiving data wirelessly.

Multiple application views may be generated from execution of one underlying application that runs the communication application plug-in, as well as one or more other application plug-ins. Each generated view may occupy only a portion of a display area. At the same time the view for the communication session is provided, an embodiment provides that one or more user-interface features are provided in a portion of the display area for use with the underlying application running the plug-in, or for use with another plug-in application. In one embodiment, these user-interface features may be provided in a region of the display that does not include the area occupied by the communication session's view.

As used herein, the term "view" means a displayed user-interface feature generated by a corresponding application. A view may (i) display information and data generated from operation of the corresponding application, and/or (ii) prompt and accept user-input for use with the corresponding application. In an embodiment, a view may be manipulated by user-input or other events in order to reflect operations of the corresponding application.

A plug-in is a component (typically software, although hardware or software implementations or possible) that can be embedded or otherwise run from within an underlying application.

Numerous types of wireless communications and wireless communication applications are contemplated in connection with embodiments described herein. In particular, one or more embodiments described herein are applicable to voice-exchange sessions, such as two-way telephony sessions, push-to-talk communications, walkie-talkie transmissions, and instant-voice transfers. However, other embodiments contemplate use of other types of data transmissions for wireless communication exchanges, including, for example, text messages, multimedia messages, documents and records, and streaming media (audio and video). In one embodiment, the wireless communications contemplated are local wireless links to Internet or other network gateways. For example, WiFi communications may be used to carry Voice over Internet Protocol voice and data communications through the Internet.

As described herein, embodiments of the invention provide that methods, techniques and actions performed by the communication device are performed programmatically, or as a computer-implemented method. Programmatically means through the use of code, or computer-executable instructions. A programmatically performed step may or may not be automatic.

Furthermore, or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

System Overview

FIG. 1 illustrates a computing device configured according to an embodiment of the invention. An example of a computing device 100 for use with one or more embodiments of the invention is a cellular device capable of transmitting and receiving voice communications over cellular networks. A specific example of a device that can be used with one or more embodiments of the invention is wireless messaging and phone hybrid, sometimes referred to as a "smart phone" or a "mobile manager". Other embodiments may apply to devices that can transmit, over cellular networks, text messages, multimedia messages, documents and records, and streaming media (audio and video).

The device 100 includes a display 108 to enable the user to view information and content, as well as a plurality of buttons 114 that enable the user to enter input. In one implementation, display 108 is contact-sensitive, so that the user may enter input by tapping a region of the display. In other implementations, device 100 may be responsive to voice commands, carry a QWERTY keyboard, and/or include a multi-dimensional mechanical interface for entering both navigation and selection input. Numerous other types of computing devices may also be employed with one or more embodiments of the invention, including for example, media playback devices.

In an embodiment shown by FIG. 1, device 100 is configured to provide an active view 120 of a wireless communication session. The active view 120 may be generated by a plug-in or embedded component to an underlying application, which in this case is a home application (an application having functionality that includes providing a listing of other applications) or today application (an application having functionality that includes providing access to other applications and information from other application, particularly in the context of a calendar or schedule). In an example shown by FIG. 1, active view 120 is generated by a phone plug-in application. The phone plug-in application may correspond to an application that enables a user to access and use cellular or wireless telephonic communication capabilities. In such an example, the active view 120 may correspond to an active call view, displaying information that includes one or more of the following: (i) session information 122 about the wireless communication session, (ii) reception information, indicating a quality of the wireless reception, (iii) information about a correspondent participating in the wireless communication, and (iv) user-interface features 126 for enabling the user to enter control data about the wireless communication session. Numerous other of types information may be displayed in the active view 120, such as for example, advertisement content, or information about streaming media being delivered to the device 100.

According to an embodiment, the active view 120 occupies only a portion 128 of an area provided by display 108. A remainder 138 of the display 108 corresponds to a view or display area of the underlying application that runs the phone/communication plug-in or embedded component. For example, the remainder 138 may display a view of a "home" or "today" application. As such, the remainder 138 of the display area may provide a "home view" (or "today" or other view). The home view may include icons or other display objects that are selectable to open the other applications. Additionally, the home view may display, for example, text-entry fields for use in searching records managed by another application, or icons to open data items, such as contact records.

In one embodiment, the active view 120 sits over the view provided by the one or more other applications when a corresponding communication session is ongoing. For example, the active view 120 may blanket a portion of the home view when the user receives or makes a call (in which case the active view 120 becomes an active call view). Alternatively, the presence of active view 120 causes the view of the other application to squish to the remainder 138 of the display 108. the user may enter input to expand the active view, or to expand the view of the one or more existing applications. The user may also enter input to hide or collapse the active view 128. As will be described, the size and the manner in which the separate views are displayed relative to one another may be set by user input. For example, the user may resize and/or move active view 120.

Figure 2A:
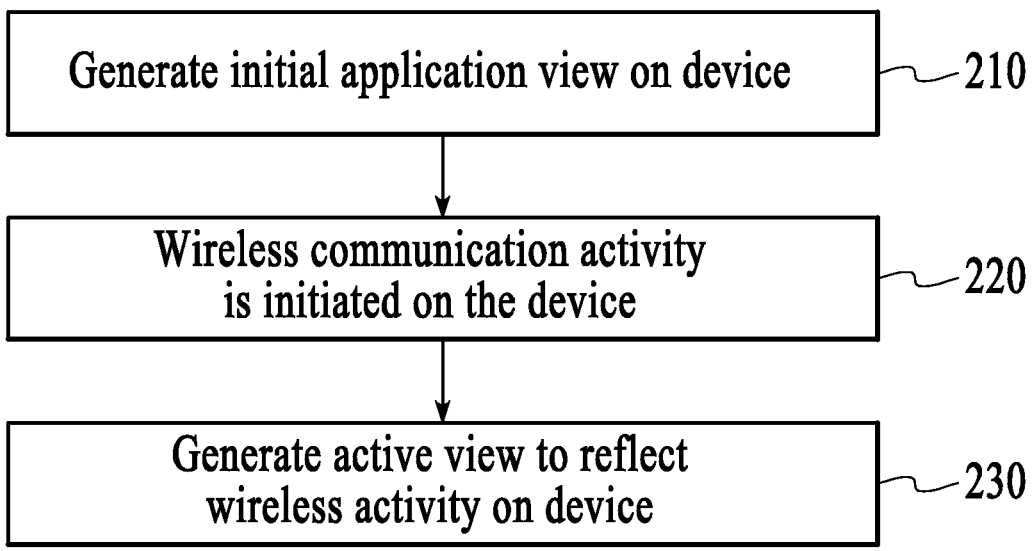
FIG. 2A illustrates a basic method for enabling an active view to be generated to reflect wireless communication activity on a computing device, under an embodiment of the invention.

FIG. 2A illustrates a basic method for enabling an active view to be generated to reflect wireless communication activity on a computing device, under an embodiment of the invention. In describing a method such as described in FIG. 2A, reference may be made to elements of FIG. 1 for purpose of illustrating suitable elements or features for use in performing a step or sub-step of the method.

Step 210 provides that an initial application view is generated on the device 100. The initial application view may be generated by any one of a plurality of applications that are executable on the device 100, independent of any wireless communications. For example, the application view may correspond to the launch of a home application, which provides a starting point for a user's experience with the device 100. With a home view (display content generated from execution of the home application), menus, icons, and fields may be displayed for launching and/or interacting with applications.

In step 220, wireless communication activity is initiated on the device. One case provides that the wireless communication activity is a phone call. As such, initiation of the wireless communication activity may correspond to an incoming call being received on a wireless radio of the computing device. For the case wherein the wireless communication activity is a phone call, initiation of the wireless communication activity may alternatively correspond to the user of the computing device taking steps to initiate a phone call, such as dialing a phone number or a portion thereof, or dialing a phone number and communicating an input to cause that number to be dialed.

However, as described above, the wireless activity may extend to numerous other types of communications, such as the downloading of programs and data, or the receipt of streaming media, documents and records, as well as messaging (both email and instant/text/multimedia messaging).

In step 230, a plug-in or other embedded component is launched to provide an active view 120 that reflects information for or about the wireless communication activity. One embodiment provides that the active view 120 is generated automatically in response to the wireless activity taking place. Another embodiment provides that the active view 120 of the wireless communication activity is generated in response to a user selection, or to some other triggering event.

Figure 2B:
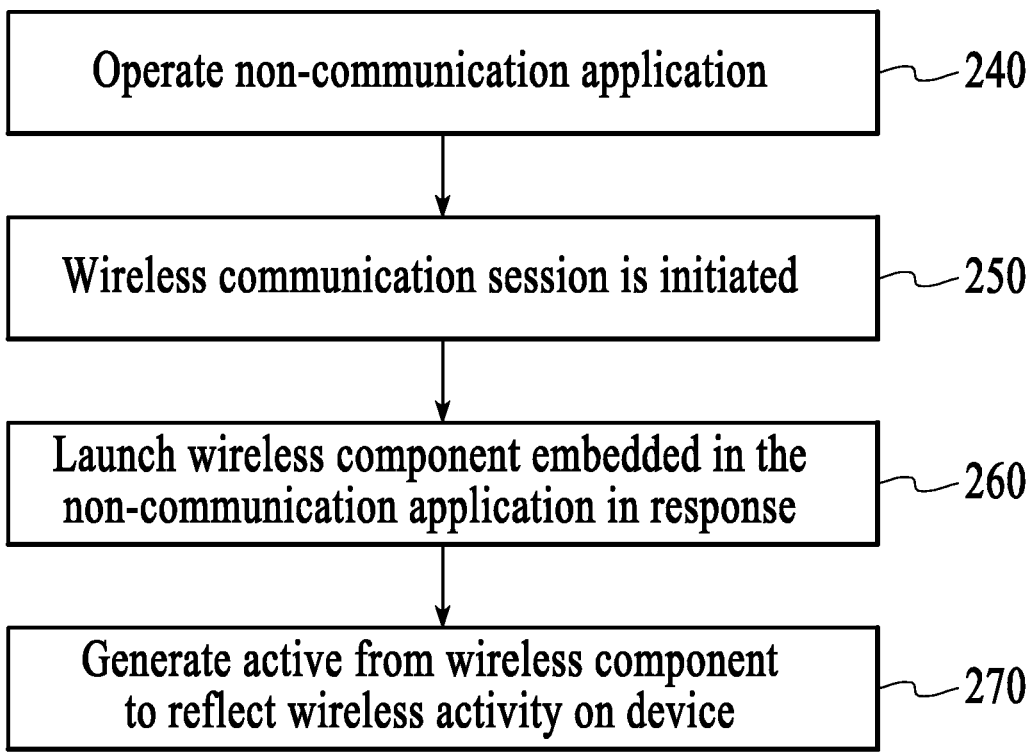
FIG. 2B illustrates another method for enabling an active view to be generated to reflect wireless communication activity on a computing device, under an embodiment of the invention.

FIG. 2B illustrates another basic method, under an embodiment of the invention. In step 240, a non-communication application is operated on the computing device. An example includes a Today application, operating off of a mobile computing device running a POCKET PC operating system, manufactured by the MICROSOFT CORPORATION. The Today application is an example of an application that is running when the user has no application with specific functionality operating. In one implementation, the Today application may provide a default state on the computing device, showing calendar appointments and emails of the day, as well as providing access to other applications that run on the device.

In step 250, a communication session is initiated. In one embodiment, the communication session is in the form of voice communications. For example, a user may place a cellular call or receive an incoming call. However, other types of communication activities are contemplated, such as the launching of an Internet browsing session or a chat or chatroom instant messaging session.

In step 260, a wireless communication component embedded in the non-communication application is operated in connection with handling communications received or transmitted during the communication session. Thus, for example, the Today application may include an embedded phone application (or phone plug-in) for handling cellular voice calls. The phone application may be embedded in the form of a plug-in. When a call is placed or received while the Today application is executing, the phone application executes to assist and/or handle data relating to the call. In one embodiment, operation of the phone application includes displaying a view generated by that wireless application.

Upon termination of the wireless communication session, step 270 provides that the wireless communication component stops operating. For example, once a phone call is terminated, any view generated by the phone application disappears. The device returns to operating the non-communication application.

In the example provided by FIG. 2B, each of the non-communication application and wireless communication application may generate views. The view generated by the wireless communication application may be active and dominant when the communication session is initiated, unless user-input indicates otherwise.

Furthermore, while FIG. 2B describes an embodiment in the context of a phone application (for handling voice calls), other communication applications are also contemplated, particularly those that can initiate and maintain a communication session for a duration that is noticeable to the user of the computing device.

Figure 3:
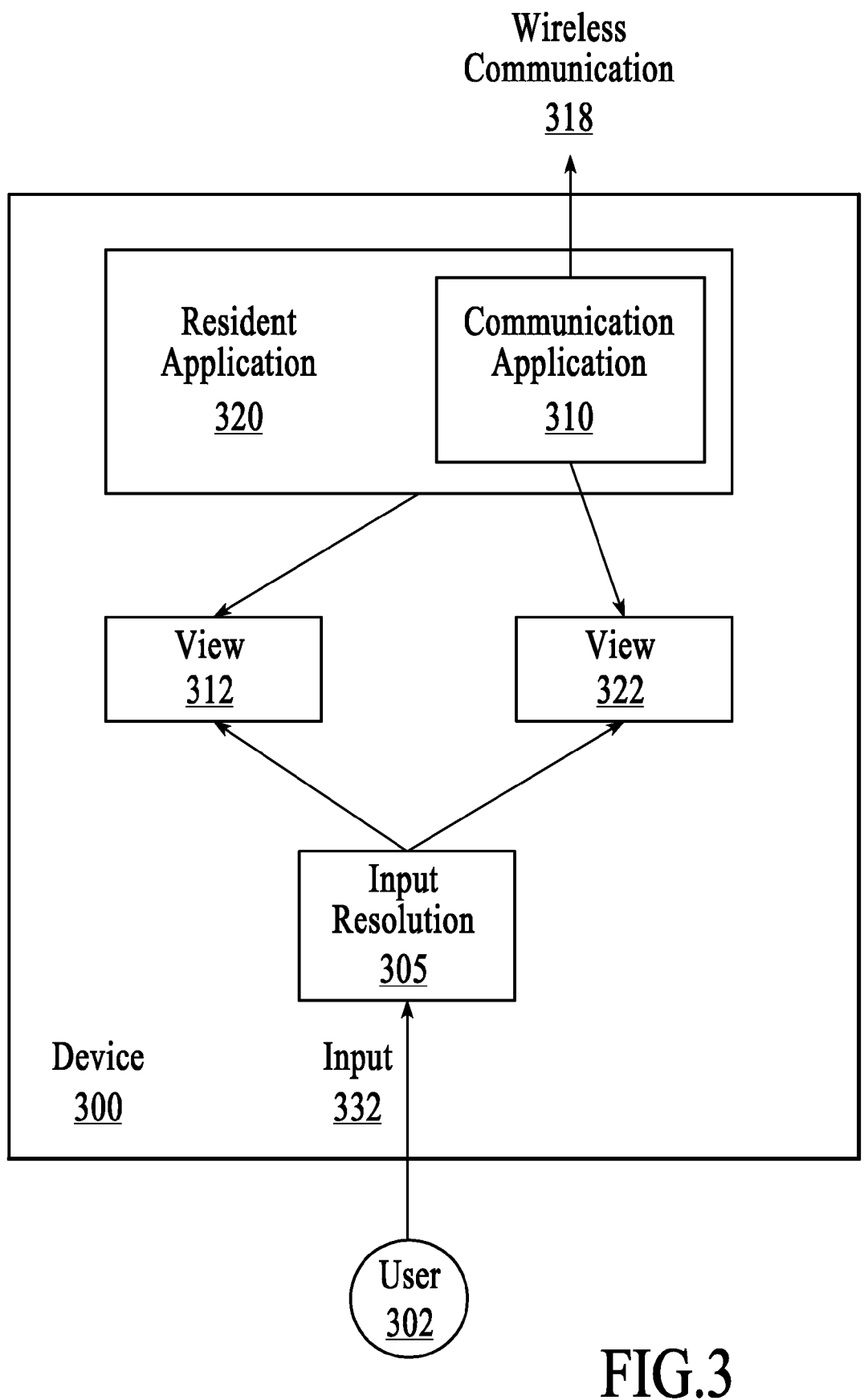
FIG. 3 is a simplified block diagram illustrating basic components and processes performed under an embodiment of the invention.

FIG. 3 is a simplified block diagram illustrating basic components and processes performed under an embodiment of the invention. In an embodiment shown by FIG. 3, a device 300 includes a resident application 320 that can operate a communication plug-in 310. In one embodiment, the resident application 320 is not a communication application, but executes the communication plug-in 310 as an embedded component. In one embodiment, the communication plug-in 310 may execute to transmit and/or receive wireless communication data 318. However, more generically, the communication plug-in 310 may simply correspond to a software or logic component that is responsive to wireless communications and/or generates data in response to wireless communications.

Each of the communication plug-in 310 and resident application 320 may generate views on the device 300. In an example provided by FIG. 3, a first view 312 is generated by communication plug-in 310, and a second view 322 is generated by resident application 320. For simplicity, an embodiment described with FIG. 3 assumes operation of only the communication plug-in 310 and the one resident application 320 in generating views 312 and 322, although additional plug-ins and/or alternative resident applications may operate to provide additional views.

The first view 312 and/or second view 322 may be made active in the response to certain events and/or conditions. In one embodiment, the first view 312 is made active with the initiation of a communication session for which wireless communication data 318 is exchanged. The initiation of the communication session may launch the communication plug-in 310 that generates the first view 312. In one implementation, second view 322 is generated by a default application that operates to provide a starting point for the user when the device is powered on, or when the user needs to switch between applications and/or views.

One function that can be provided by the first view 312 and/or the second view 322 is to display content, information and data to the user about the execution of the underlying application. Another function that can be provided by one or both views is to prompt the user for input. A prompt for input may correspond to displaying an object that the user can interact with. Examples of such objects include icons, menu items, and text fields. In an embodiment shown by FIG. 3, the first view 312 displays dynamic information, reflecting a state or status of the wireless communication at a particular instant in time. For example, a time element may display a duration of the wireless communication session. The first view 312 may also display static information, such as the name of a correspondent participating in the communication session. Additionally, as will be described, the first view 312 may include prompts that enable the person to enter control data for controlling the operation of the communication plug-in 310. For example, the first view 312 may enable the user to enter input for terminating or pausing the communication session.

Since both the first view 312 and a second view 322 may include prompts to invite user input, a mechanism may be needed to determine what application is to process any input that the user enters. Accordingly, an embodiment may include a programmatic input resolution mechanism 305 that handles an input 332, and determines what application is to receive that input. The input resolution mechanism 305 may correspond to one or more processes that implement protocols or processes for determining which available application should receive the input.

The input resolution mechanism 305 may process input 332 differently, depending on the type and/or value of the input. For example, an embodiment contemplates inputs that are in the form of a button press. In such a case, the input resolution mechanism 305 may decide which application should receive the input based on, for example, (i) whether the button press is from a QWERTY key, (ii) whether the button press was a press and hold, and (iii) a value (e.g. letter or number conveyed by the button) of the button press. Other examples of the types of input that may be received and processed by the input resolution mechanism 305 include a screen tap (in the case where the display of the device is contact-sensitive), a voice command, a navigation input, and an application button (e.g. a non-QWERTY key) selection. Further description on how different types of inputs may be handled are described with FIGS. 7A and 7B, and elsewhere in this application.

Other factors may come into play in determining what application is to receive input 332. In one embodiment, one of the first view 312 or second view 322 may be in focus. The state of being in focus may correspond to one of the views being highlighted, or placed in a state of partial selection (subsequent input may place the state in a selected state). An example of focus without selection is a single tap on an icon, when a double-tap is needed to activate the icon. The first tap may highlight the icon, thus placing it in focus. If one of the views is in focus, the protocol implemented by the input resolution mechanism 305 may prioritize that view over the view that is not in focus.

Another factor that may influence what application receives input 332 is a state of use of the underlying application. For example, in the case where the communication application 310 corresponds to a phone application, the input 332 may be treated differently if the phone call is active, as opposed to the phone call being on hold.

Active Call View Generation

Figure 4:
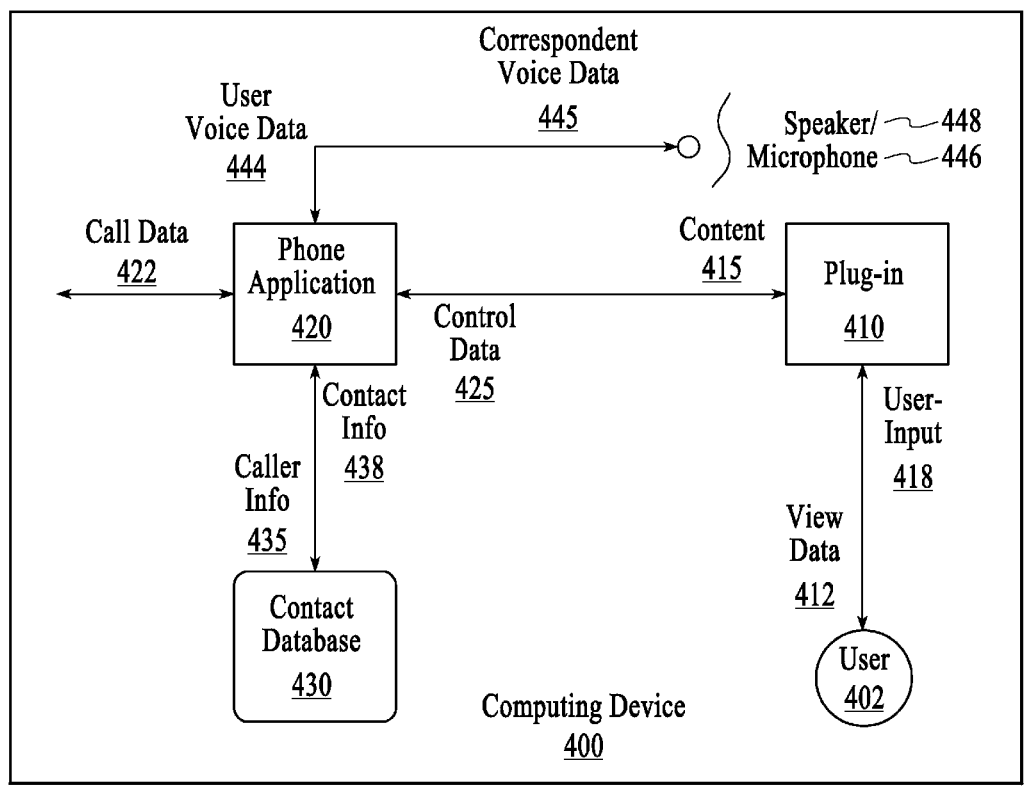
FIG. 4 is a block diagram illustrating components of a computing device that is configured to provide an active view of a call in progress, according to an embodiment of the invention.

According to one implementation, an active call view may be generated by a phone application that executes to handle a phone call (or other for of voice-exchange) over a data network. The data network may correspond to, for example, a cellular network, although other networks such as the Internet (for VoIP or voice-messaging) are contemplated. FIG. 4 is a block diagram illustrating components of a computing device 400 that are configured to provide an active view of a call in progress, according to an embodiment of the invention. In an embodiment shown by FIG. 4, an active call plug-in 410 is used to generate the active call view. The plug-in 410 may interface with a phone application 420 to generate view data 412.

Alternatively, the phone application 420 and the plug-in 410 may be the same application. For example, the plug-in 410 may carry all the functionality of the phone application 420. In on embodiment, the view data 412 may be rendered on a discrete portion of the display for the device, so as to form the active call view. In another embodiment, a different presentation may be used to provide view data 412. For example, the view data 412 may be divided into cells, and/or integrated with user-interface features provided by other applications.

During a phone call or other voice-exchange session, phone application 420 may send and receive call data 422. Call data 422 may include data representing voice exchanges from both the user of the computing device 400, and one or more participants of the session. Additionally, call data 422 may include (i) for incoming calls, "caller ID" information, such as the phone number and name of the caller, (ii) DTMFDTMF tones, and (iii) for broadband wireless communications, non-voice data that may be transported between caller and recipient during an ongoing communication session. With respect to an embodiment shown by FIG. 4, voice utterances of the user of the computing device 400 may be captured by the microphone 446 and carried into the call data 422 by the phone application 420. Likewise, correspondent voice data 445 contained in the incoming portion of the call data 422 may be translated into audio by the phone application 420, and outputted through a speaker 448.

The plug-in 410 may provide content in the form of information and images in the view it provides for the phone application 420. In one embodiment, at least some of the content provided in the view of the plug-in 410 is derived from content data 415. The content data 415 may be generated in part by the phone application 420 during the voice-exchange session. For example, the phone application 420 may provide information that includes the name of the other person(s) on the call, and the duration of the call. It is also contemplated that the plug-in may generate view data 412 to include information and content from other application or sources.

In one embodiment, the content 415 provided to the plug-in 410 includes contact record information 438. Contact record information 438 is information contained in a stored contact record of a participant in the communication session. For incoming calls, the contact record information 438 may be determined by matching caller information 435 (e.g. "Caller ID" information) with field values of stored contact records in a contact database 430. For outgoing calls, the user's input in placing the call may identify the contact record. For example, the user may select the name of the contact from the contact database, or enter a number that has a match with a record in the contact database 430. In either case, the content record information 438 may include, for example, one or more of the following: correspondent name, phone number, one or more alternative phone numbers for the correspondent, a picture associated with the contact record of the correspondent (which may or may not be of the correspondent), and message identifiers (e.g. email address, SMS address).

The content 415 provided by the phone application 420 may include some or all of the content record information 438, as well as some information contained or determined from the call data 422, or through execution of the phone application 420 (e.g. duration of call). While an embodiment such as shown in FIG. 4 provides that the content 415 for generating the view data 412 is provided to the plug-in 410 by the phone application 420, other embodiments may provide other programs or sources for obtaining some or all of the content 415. For example, plug-in 410 may be configured to receive caller information 435 from the phone application 420, and to retrieve the matching record from the contact database 430.

According to an embodiment, view data 412 includes the content 415 and one or more programmatic control features for enabling the user to enter input that affects operation of the phone application 420. In the context of a phone call, the control features may include, for example, "hang-up" to terminate a phone call, and "hold" to place a call on hold. The control features may be provided as displayed objects that are actionable by the user, through, for example, a button press or other selection action. In providing the control features, the user 402 may be enabled to enter inputs 418. The plug-in 410 may handle the inputs 418 by signaling control data 425 corresponding to the inputs to the phone application. For example, the control data 425 may direct to the phone application 420 to terminate the session, or place the call on hold.

In an embodiment, the device 400 may provide multiple plug-ins at one time. The plug-in 410 may be executed to generate a view in connection with the presence of other plug-ins for other applications. When multiple plug-ins are executed on one device, an embodiment provides that each of the plug-ins may be displayed, hidden, or re-ordered. Individual plug-ins may be varied in dimension on the display of the device 400. When an application is not running, the corresponding plug-in may be displayed as a selectable display object. Selection of an object corresponding to a plug-in causes the application associated with the plug-in to launch. Thus, the user of device 400 may launch the phone application 420, and initiate a phone call, for example, by selecting an icon or other display object representing the plug-in 410.

Active Call Example

Figure 5A:
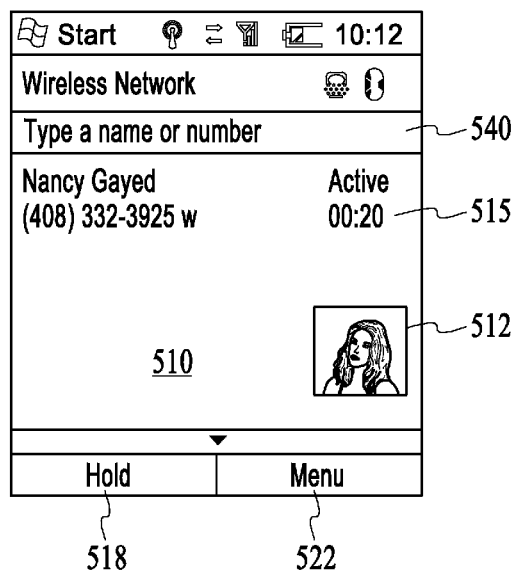
FIG. 5A and FIG. 5B illustrate an active call view for handling a single call, under an embodiment of the invention.
Figure 5B:
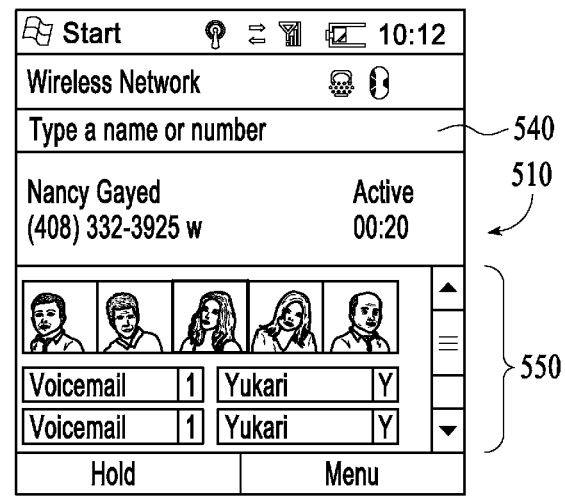

FIG. 5A and FIG. 5B illustrate examples of views that may be generated in connection with operation of a phone application, such as described with FIG. 4, under one or more embodiments of the invention. FIG. 5A illustrates an expanded view 510, illustrating the appearance of an active call view using content 415 (FIG. 4) from the phone application and/or the session. In an example shown by FIG. 5A, information displayed in the view 510 includes contact record information 438 (FIG. 4) in the form of a name and phone number of the contact record for the correspondent. Additionally, an image 512 may be included as part of the contact record information. The image 512 may be stored or associated with the contact record for the call.

The view 510 may also display information about the call in progress. In the example provided by FIG. 5A, this information corresponds to a clock 515 that keeps track of the duration of the call.

The view 510 may incorporate programmatic control mechanisms in the form of one or more soft keys 518. In one implementation, the soft keys 518 are provided within the border of the view 510. In another implementation, the soft keys may be incorporated into a taskbar or other existing user-interface feature. Still further, soft keys may exist in the form of menus 522 or semi-persistent icons, and the appearance of the view 510 may configure the soft keys for functions that may involve the view 510 or the underlying phone application.

FIG. 5A also displays other views for different underlying applications. A contact bar view 540 is provided above the view 510. The contact lookup view 540 may act as an interface to an address book application that manages contact records on the user's device. The contact lookup view 540 may enable the user to enter a string of alphanumeric characters which are then matched to contact records.

FIG. 5A also illustrates how the view 510 enables the user to access additional functionality of the computing device while a phone call is in progress. The view 510 occupies only a portion of the total display area, so that the contact lookup view 540 is visible and accessible to the user. During a phone call, the user can enter input, for example, to locate a contact. Rather than have the phone application's view occupy the entire display, the user can locate and use a feature of another application. This provides a more favorable experience to the user as compared to some past approaches, where navigating between the interfaces of different applications that occupy the entire screen made the user feel "lost" and prone to making an error, such as inadvertently terminating the call. An embodiment also provides that the area of the view 510 may be enlarged or reduced at the option of the user, based on preferences or needs of the user.

If the user decides to interact with the view of another application, the view 510 of the active call may be reduced or minimized. FIG. 5B illustrates the view 510 in a collapsed form. In the collapsed form, the size of the view 510 is significantly reduced, allowing, for example, another application interface or view to be made visible. The shading of the view 510 may also be altered to visually integrate the view 510 with other views or display features. In the example provided, the user has available both the contact lookup view 540 and a speed-dial interface 550 available. Both of these programs may facilitate the user in a phone call, for example, by locating a number and/or enabling contact with another correspondent for a group conference call.

Multi-Call View

Figure 6A:
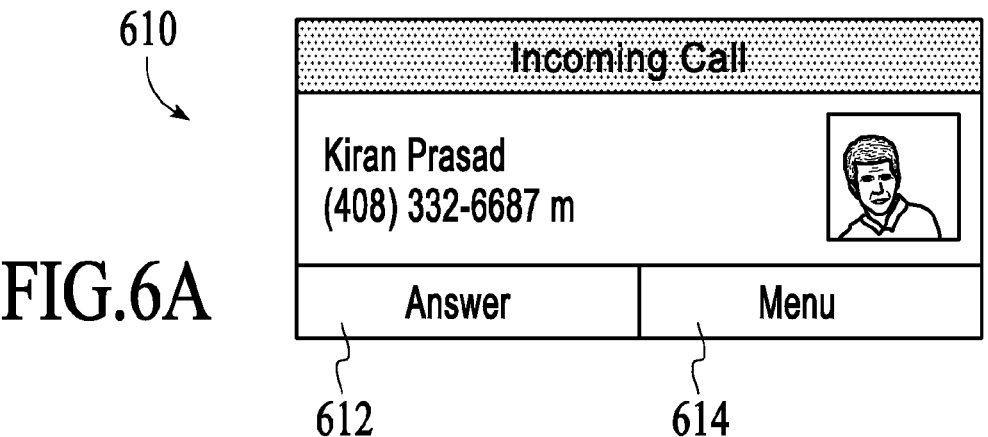
FIG. 6A-6E illustrate different implementations of an active call view for handling one or more calls, under one or more embodiments of the invention.
Figure 6B:
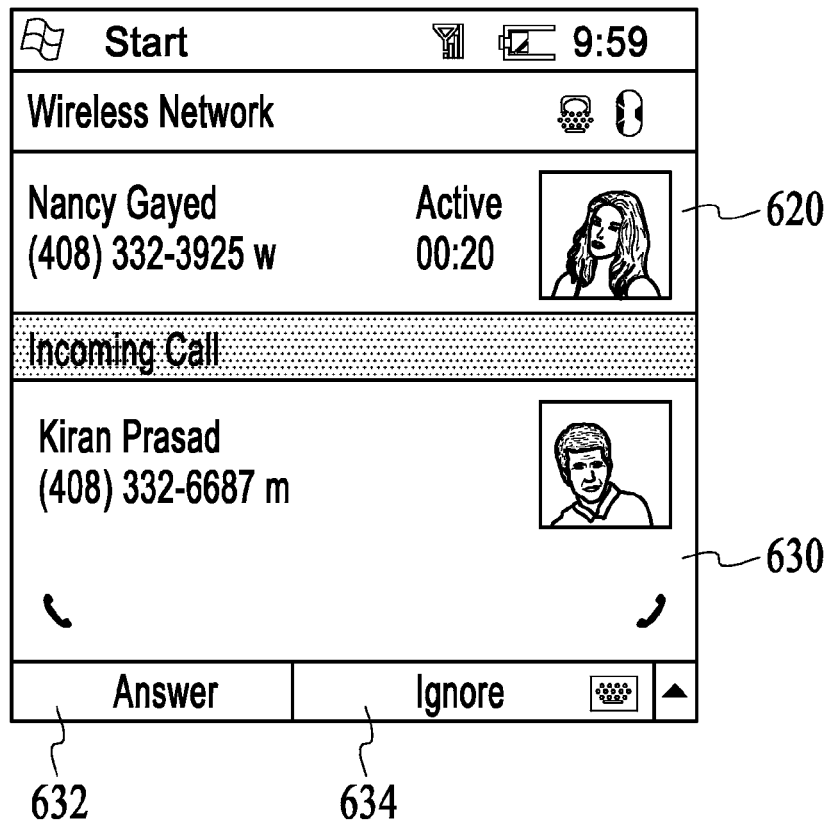
Figure 6C:
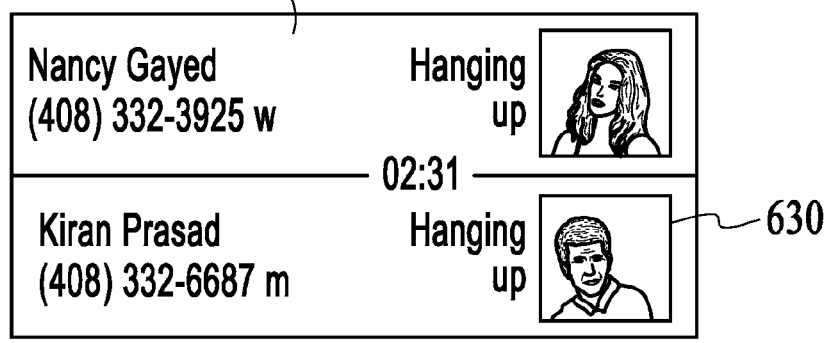

If multiple callers are handled at one time, an embodiment provides that one or more views are generated for each of the calls handled. FIG. 6A-6C illustrate different examples of how a second call is received and incorporated as view content in a display of a computing device.

FIG. 6A illustrates a view 610 in the form of a notification, announcing an incoming call. If the phone application (or other application resource) is able to identify the caller, then the view 610 may include information from the contact record of the caller. In the example shown, this information includes an image of the caller (as stored with the contact record) and a phone number being used by the caller. The user may act on the answer feature 612 to answer the call, or use the menu feature 614 to perform other functions, such as decline the call, or text message respond to the call.

If another call is in progress on the computing device, one embodiment provides that separate views are generated for each call. In one implementation, each view may be generated from execution of an instance of a plug-in application. FIG. 6B illustrates the case where a view 630 for a new incoming call is added to a display area for which there already is an existing view 620 for another call. The view 630 of the incoming call may receive focus automatically, so that the user's interaction with the computing device are assumed in most cases to be with the view 630. The user may, for example, select the answer feature 632 or the ignore feature 634 to control the phone application with respect to the second call. The existing call may be ongoing. One implementation provides that answering the incoming call through the answer feature 632 also causes the phone application to place the first call on hold. In another implementation, selection of the answer feature 632 conferences the first call and the second caller. Still further, selection of the answer feature 632 may terminate the first call automatically, unless the user operates the view 620 of the first call to place that call on hold. In either case, the answer feature 632 of the second incoming call may be operated by the user to control both calls.

FIG. 6C illustrates how the view 630 of the second call and the view 620 of the first call may be integrated on the display area of the computing device, under one implementation. The view 630 of the second call and the view 620 of the first call may adjoin one another on the display area. Other implementations may enable the two views to be separated, or even combined into one view. In an implementation, each view is generated by an instance of a plug-in application.

Figure 6D:
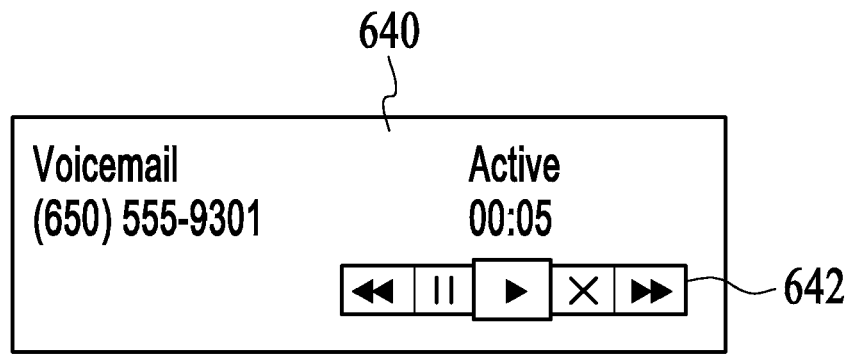

FIG. 6D illustrates a view 640 generated for a voicemail call, under an embodiment. The computing device may enable the voicemail to be controllable from the device using display objects, for example. For example, the computing device may be configurable to dial the voicemail as a speed dial, and then automatically submit a series of numbers that correspond to the user's password. Once access to the voicemail is achieved, the user may use designated shortcut actions to play new voicemails, delete voicemails, fast forward or rewind. Such capabilities of the computing device may be integrated into the active call view 640. When the computing device detects the number dialed is the user's voicemail, the view 640 may automatically generate to include the voicemail control feature 642. The voicemail control feature 642 may provide shortcut voicemail control actions in the form of one or more display objects. In the example provided by FIG. 6D, the voicemail control feature 642 may include display objects that can be selected to cause on of the programmed voicemail actions (e.g. play, stop, rewind and fastforward), such as through user-contact with the display area (assuming the display of the computing device is contact-sensitive).

Figure 6E:
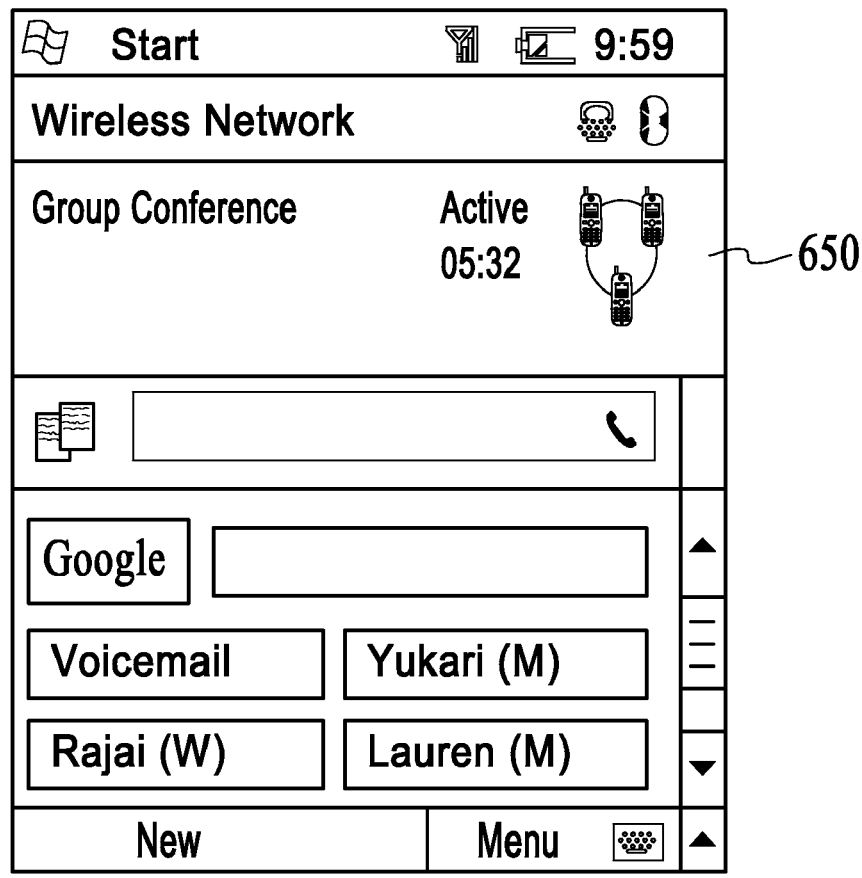

FIG. 6E illustrates another view 650 for the case of a conference call, where multiple callers are joined through the computing device. The view 650 may carry information reflecting the type of call (conference call). Alternatively, the view 650 may include information about the callers, when that information is known.

Numerous alternatives and variations to implementations described above are contemplated by embodiments of the invention. For example, an alternative implementation includes having an active call view, generated by a phone plug-in to a base (e.g. Home or Today) application. In response to an incoming call (or the user placing an outgoing call), the plug-in is executed by the base application. The plug-in may generate a view that takes over and/or dominates the display of the computing device, at least as an initial state. However, the user may enter input to generate multiple views, including one corresponding to the active call view. In one implementation, the user may operate a multi-navigation input mechanism (i) to switch between single or dominant view setting and (ii) multi-view setting. The user may enter input in one direction (e.g. side to side) to switch between single/dominant view setting and multi-view setting. The user may enter input to also navigate and select display objects from within displayed views. For example, the user may enter lateral input from a multi-directional input mechanism to select multi-view display presentation, then enter vertical input to navigate and select within a view that is in focus or selected.

Input Resolution

When multiple views are active or available on one display area, an input entered by the user needs to be resolved as to the particular application or plug-in that is to receive that input. Protocols may be employed to determine what view (and thus plug-in or application) is to receive the input. Several factors may be employed to determine how a particular input is to be treated. According to one or more embodiments, these factors may include: (i) the type of input (e.g. QWERTY input, press and hold, soft key), (ii) the views present on the display area, and (iii) the view that is in focus. A view in focus corresponds to the view that is active with the highest priority. This designation may be made by default or programmatic implementation in response to specific events, or through user-input.

Key-down events provide an example of one type of input for which a resolution protocol may be implemented to determine the application that is to receive the input. In one embodiment, a key-down event may correspond to a button press, or a press and hold. In a simple case where the key-down event is a button press and multiple views are present on a computing device, one embodiment provides that the view in focus may process the button press first. Often, a button press can carry more than one value. For example, if the button is one key of a QWERTY keyboard, the button press may carry a number or character value. The value assigned to the button press may be determined by the view that "swallows" the input. For example, if the contact lookup feature is in focus, the button press may be interpreted as both character and number simultaneously, so that a contact record search is performed using the contact record name and the contact record phone number. Contact records matching both interpretations may form the result. However, if an active call view or phone application swallows the input, the button press may be interpreted numerically. If, for example, a call is in progress, the input may be identified for its Dual Tone Multi-Frequency Tones (DTMF) value.

Figure 7A:
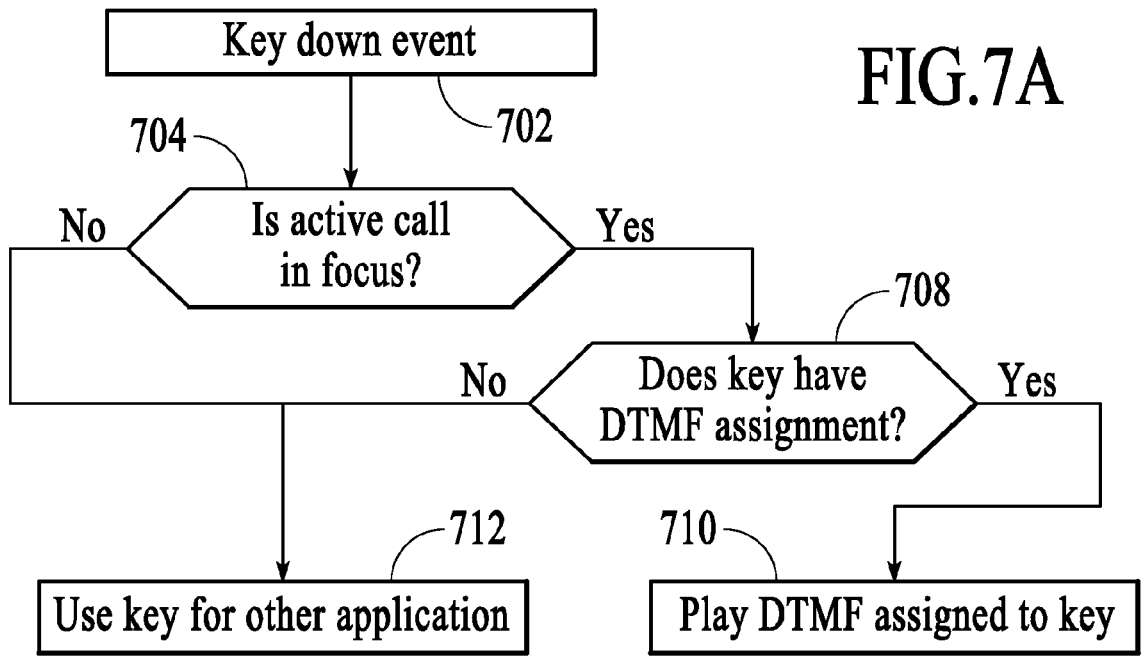
FIGS. 7A and 7B illustrate different methods for determining an application that is to receive a user-input when multiple views or user-interface features for different applications are available at one time, according to one or more embodiments of the invention.

In a more complicated the case, a determination may be needed as to whether a key down event is a button press or a press and hold. The interpretation of the key down event may effect the application that handles the input. FIG. 7A shows an embodiment in which a key-down event is interpreted and assigned to a particular application based on a set of rules and conditions. FIG. 7A assumes that when the key-down event occurs, an active call view is present, and one or more other applications are available to receive the input.

In step 702, a key down to that is detected from a QWERTY key. In one embodiment, in active call view has priority over other applications and plug-ins if the active call view is in focus. One reason for prioritizing the active call view it as to accommodate the users entry of DTMF tones. For example, one embodiment makes the assumption that, when a call is in progress, any button press for which there is a DTMF assignment is to be assumed as being a DTMF input. The designation that any input that has DTMF interpretation must be interpreted as such when the active call view is in focus may be based on user behavior, and/or on service requirements by providers and carriers.

Accordingly, a determination is made in step 704 as to whether there is an active call view in focus. If there is in active call view in focus, then a determination is made in step 708 as to whether the button press has a DTMF value. In one implementation, only QWERTY keys that have numeric values of 0-9 and "#" (and possibly "*") have DTMF values. If the button press has a DTMF value, then step 710 provides that the input is processed by the phone application playing the DTMF value.

If the determination in step 704 is that the active call is not in focus, or if the determination in step 710 is that the button press does not have a DTMF value, then step 712 provides additional steps where the input is resolved for other actions and applications. In an embodiment, one or more other applications may make the determination as to how the button press is to be handled based on whether the button press qualifies as a press and hold. For example, if the key-up occurs before a duration in which the key-down satisfies a press and hold action, then any active view or plug-in may accept the input. If the key-down does qualify as a press and hold, then a designated press and hold action may be performed, regardless of what application (other than the active call view) is in focus. Thus, an embodiment provides the following order of priorities for key-down events (such as QWERTY key strikes): (i) if an active call view is in focus, interpret the button press as a DTMF input when possible; (ii) if the button press is not a DTMF value, but a press and hold, then the press and hold action is performed; then (iii) the plug-in, view or application in focus receives the key-down input. One implementation provides as default that the view of any active call is in focus, or made out of focus. Thus, in the example where a computing device is handling a cellular call, a key-down event is first handled by the phone application or its view.

The example provided by FIG. 7A provides one implementation for handling a specific type of input. It should be noted that other implementations may use different rules for handling the same kind of input. For example, if the button press qualifies as a press and hold, an alternative embodiment may provide that the press and hold action takes precedence over the DTMF assignment, even if the active call view is in focus.

Other procedures may be implemented for providing support and resolution for other kinds of input. For example, another type of input that can be handled by the computing device is a soft key input. The soft key corresponds to a display area on a contact-sensitive display that can be contacted by the user to enter a specific input. Soft key support entails generating the soft keys on the display of the computing device. When multiple active views are present, resolution is needed in the following respect: (i) assigning existing soft keys (or their locations) to a desired active view, and (ii) interpreting soft key input for the correct plug-in, view or application.

Figure 7B:
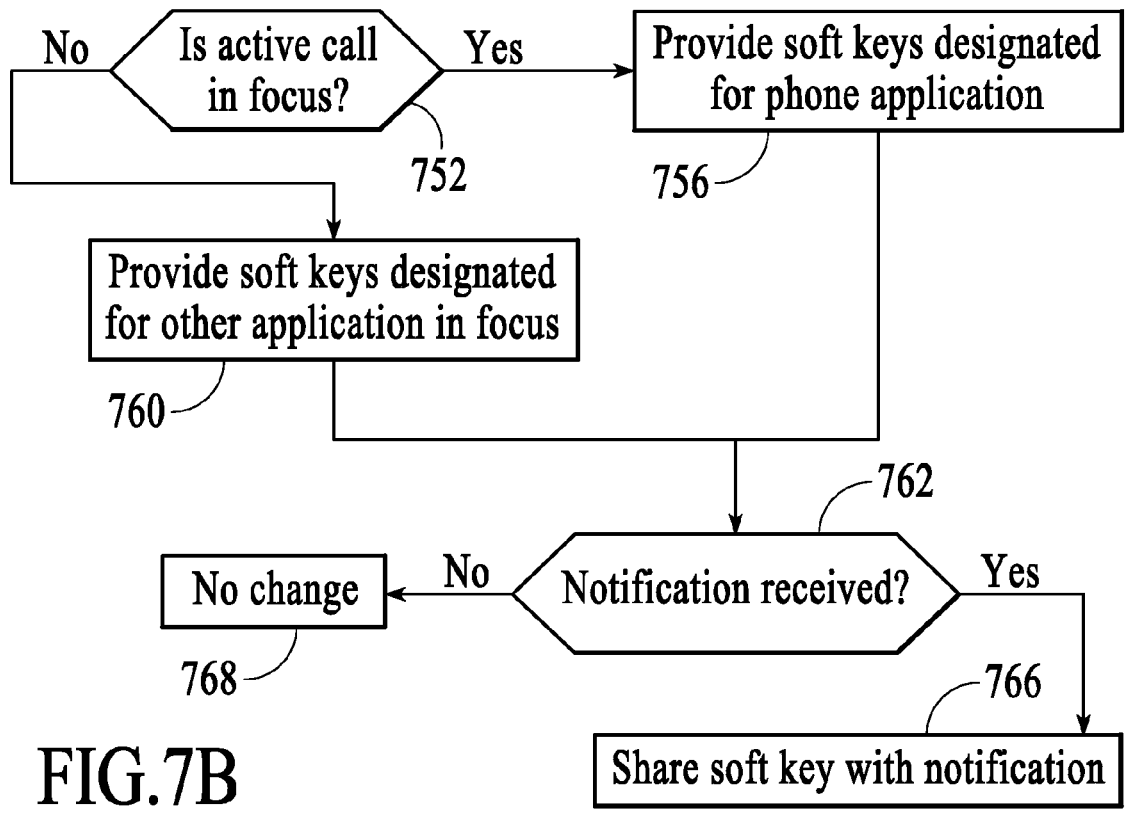

FIG. 7B illustrates a method for resolving soft key inputs, under an embodiment of the invention. Initially, soft keys are generated and/or designated for a particular view, plug-in or application. When an active call view is present, one embodiment provides that the active call view is prioritized over other applications. Accordingly, step 752 makes a determination as to whether the active call view is in focus. If the determination is that the active call view is in focus, then step 756, one or more soft keys are generated and/or assigned to the active call view. For example, soft keys may be made to appear in the active call window, and these soft keys are actionable by the user so long as the active call view is in focus.

Alternatively, a designated region where soft keys are provided may be configured for the active call view when the active call view is in focus. For example, in a persistent (or semi-persistent) task bar, a menu field may be invoked by the user. When the active call view is in focus, step 756 provides that the menu is populated by entries that correspond to soft keys for the active call view.

Step 760 provides that the soft key configuration of the menu may change and be configured for another application if an other application is or becomes in focus. Thus, for example, the user may de-select the active call view, in which case another soft key configuration may be supported. For example, another set of soft keys in the view of another application may be made active, or the entries in a menu may be configured for use with the active application.

At any time a notification is received on the computing device, an embodiment provides that soft key support for handling the notification may take precedence. Accordingly, step 762 makes a determination as to whether a notification is received. In step 766, when a notification is received, soft key support is provided for handling the notification. In one implementation, the soft key support is in the form of the notification and the active call view sharing one or more soft keys. Otherwise, step 768 provides that no change is made to the soft key support so long as the active call view is in focus.

Hardware Implementation

Figure 8:
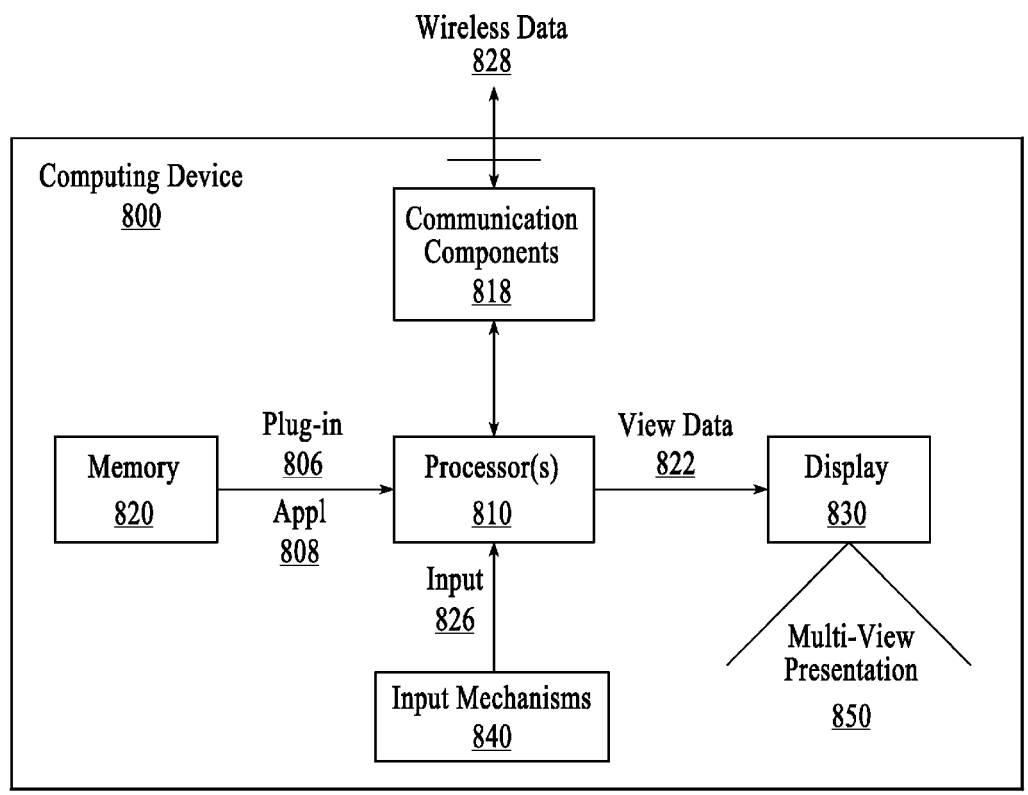
FIG. 8 illustrates a basic hardware diagram of a computing device configured under an embodiment of the invention.

FIG. 8 illustrates a basic hardware diagram of a computing device configured under an embodiment of the invention. A computing device 800 is shown to include a processor 810, one or more memory components 820, a display 830, and one or more input mechanisms 840. The one or more input mechanisms may include, for example, keys or buttons that may be pressed to generate an input 828. In one implementation, input mechanisms 840 include a QWERTY style keyboard. In addition, display 830 may be contact-sensitive, and contact values generated from contact with display 830 may be processed as an input 828.

The computing device 800 may be enabled to transmit data over cellular networks. As such, one or more communication components 818 may exchange wireless data 828 using a cellular network.

In an embodiment, the processor 810 retrieves and executes instructions corresponding to a plurality of applications 808, and a plurality of plug-ins 806 used by those applications. In an embodiment, one or more of the plug-ins are executable from one or more applications to form a displayed portion of the display 830. The plug-in 806 for a communication application such as described above may be executed to generate view data 822. Other plug-ins may also be executed to generate additional view data 822. In one embodiment, the view data 818 generated by the execution of one or more plug-ins may be used to create a multi-view presentation on the display 830. Among other operations, the processor 810 may execute instructions for (i) determining what views and underlying applications are in focus, and implementing rules or protocols for determining the handling of input 826 from the input mechanisms. When an active call or other communication session is in progress (and in focus), the processor 810 may use wireless communication components 818 to generate content and information for the active view of that communication session. In order to provide content for the active call or communication view, an embodiment provides that other resources, such as a contact database in the memory component 820, are accessed.

Alternative Embodiments

While an embodiment described above provides for active views for communication sessions that are in progress, one or more embodiments also contemplate views for communication sessions that are passive. One example of such a view is an Internet search tool bar, which can be implemented by a plug-in that acts in coordination with an underlying application. The underlying application may reside on the computing device, on a server, or shared by both. A user may enter a text entry into the tool bar and trigger the computing device to make a wireless communication that conveys the text entry. The underlying application may submit the text entry to a corresponding search engine (e.g. GOOGLE), receive a search result, parse the search result and prepare it for display Either the underlying application, or the search engine may wirelessly transmit data corresponding to the search result back to the computing device. Alternatively, a proxy application may transmit the search result from the search engine (and also forward the text entry to the search engine). The transmitted data may enable the computing device to render the search result, or a portion of it, on a display area of the computing device. The amount of display area designated for the search result may be one of design choice. In one embodiment, all of the display area may be used to display the search result.

While embodiments described above specifically recite a context of telephony and voice-exchange sessions, other embodiments contemplate use of other types of wireless communication sessions. For example, a view such as described in FIG. 1 may reflect an ongoing text messaging session between the user of the computing device and one or more other users.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for operating a computing device, the method comprising:

operating a non-communication application;

concurrently with operating the non-communication application, operating a wireless communication application, the communication application using or being responsive to data generated from a communication session in which data is both transmitted and received wirelessly on the computing device to provide for a participation of a user in the communication session;

wherein operating the wireless communication application includes generating an interface on the computing device for the user to access and use in controlling the communication session, the interface being generated to be either in focus or accessible to the user when the user operates the non-communication application while the communication session is ongoing;

providing an input mechanism independently of the communication application and the non-communication application;

detecting the user performing an action on the input mechanism of the device in order to enter an input, the input being of a type that can be interpreted by either the communication application or the non-communication application;

programmatically selecting one of the communication application or the non-communication application to process the input from the action being performed on the input mechanism, based on a pre-established protocol or condition by which the communication application and non-communication application are operated.

2. The method of claim 1, wherein operating the communication application includes generating the interface to include a view for the communication session on a display area of the computing device, wherein the view occupies only a portion of the display area.

3. The method of claim 1, wherein operating the wireless communication application includes operating a phone application to transmit and receive voice data for a telephonic communications session that is connected on the computing device.

4. The method of claim 2, wherein generating a view includes displaying information about the communication session.

5. The method of claim 2, wherein generating the interface to include the view includes displaying content comprising one or more of (i) status information about the communication session, (ii) information about a correspondent of the communication session, or (iii) information about a communication link of the communication session.

6. The method of claim 5, wherein the information about the correspondent of the communication session includes an image of the correspondent.

7. A method for operating a computing device, the method comprising:

providing a first view on a display area of the computing device from execution of a first application; and concurrently with providing the first view, providing a second view on the display area from execution of a second application, wherein the second application handles wireless data that is transmitted and received during an established wireless communication session that includes participation of a user;

providing an input mechanism independently of the first application and the second application;

detecting the user performing an action on the input mechanism of the device in order to enter an input, the input being of a type that can be interpreted by either the communication application or the non-communication application;

programmatically selecting one of the first application or the second application to process the input from the action being performed on the input mechanism based on a pre-established protocol or condition by which the first application and second application are operated.

8. The method of claim 7, wherein providing the first view and providing the second view includes making a first set of user-interface features for the first view and a second set of user-interface features for the second view available at the same time on the display area while the communication session is active, and wherein the method further comprises enabling the user to switch from using either of the first or second set of user-interface features to using another of the first or second set of user-interface features.

9. The method of claim 7, wherein the second application corresponds to a phone application, and wherein providing the second view includes displaying information about a connected telephonic session as at least a part of the second view.

10. The method of claim 9, wherein providing the second view includes displaying information about the state or status of the connected telephonic session in progress.

11. The method of claim 10, wherein providing the second view includes displaying information about a correspondent of the connected telephonic session.

12. The method of claim 11, wherein displaying information about a correspondent of the connected telephonic session includes using information retrieved from a contact record stored on the computing device.

13. The method of claim 12, wherein displaying information about a correspondent of the connected telephonic session includes identifying information of either (i) a caller of an incoming call, or (ii) a recipient of an outgoing call, and matching the information to the contact record stored on the computing device.

14. The method of claim 13, wherein identifying information includes identifying one or more of (i) a phone number of the correspondent, or (ii) a name of the correspondent.

15. The method of claim 9, wherein providing the second view includes providing one or more features for enabling the user to control the connected telephonic session.

16. The method of claim 15, wherein providing one or more features includes providing a feature for enabling the user to specify a phone number for the connected telephonic session.

17. The method of claim 16, wherein providing one or more features includes providing a feature for enabling the user to accept or decline an incoming phone call.

18. The method of claim 7, wherein providing a second view on the display area includes handling multiple connected telephonic sessions on the computing device at one time through execution of the second application.

19. The method of claim 18, wherein handling multiple connected telephonic sessions on the computing device at one time through execution of the second application includes operating the second application to conduct a telephone conference using two or more other callers on two or more communication channels.

20. The method of claim 7, further comprising enabling a user to switch focus from one of the first view or second view to the other of the first view or second view.

21. The method of claim 7, wherein the method further comprises enabling the user to hide the second view while the communication session is in progress.

22. A method for operating a computing device, the method comprising:
concurrently displaying at least a first view and a second view, wherein the first view is generated by a resident application and the second view is generated by a phone application;
providing an input mechanism independently of the resident application and the phone application;
detecting the user performing an action on an input mechanism of the device in order to enter an input, the input being of a type that can be interpreted by either the communication application or the non-communication application, wherein each of the resident application and the phone application is operable to process the input, but for that both the resident application and the phone application concurrently display the first view and the second view;
selecting one of the resident application or the phone application to handle an input from the action being performed on the input mechanism when the first view and the second view are displayed and a telephonic session is connected and ongoing;
wherein selecting one of the resident application or the phone application to handle the input includes using a pre-established protocol or condition by which the resident application and phone application are operated.

23. The method of claim 22, wherein the phone application is implemented as a communication plug-in that is responsive to data generated by or used in connection with the connected telephonic session.

24. The method of claim 22, wherein using a pre-established protocol or condition includes determining which of the resident application or the phone application is to handle a key down event when the telephonic session is connected.

25. The method of claim 22, wherein using a pre-established protocol or condition includes determining that one of the first view or second view is in focus.

26. The method of claim 22, wherein using a pre-established protocol or condition includes designating a default priority for the first view and the second view in response to one or more defined events.

27. A computer-readable medium that stores instructions for operating a computing device, the instructions including instructions for performing steps comprising:
operating a non-communication application; and
concurrently with operating the non-communication application, operating a wireless communication application in connection with a communication session in which data is both transmitted and received wirelessly on the computing device to provide for a participation of a user in the communication session;
providing an input mechanism independently of the communication application and the non-communication application;
wherein operating the wireless communication application includes generating an interface on the computing device for the user to access, the interface being generated to be accessible to the user when the user accesses an interface of either the non-communication application or another application during the communication session;
detecting the user performing an action on an input mechanism of the device in order to enter an input, the input being of a type that can be interpreted by either communication application or the non-communication application;
programmatically selecting one the communication application or the non-communication application to process the input from the action being performed on the input mechanism based on a pre-established protocol or condition by which the communication application and non-communication application are operated.

28. A computer-readable medium that stores instructions for operating a computing device, the instructions including instructions for performing steps comprising:
concurrently displaying at least a first view and a second view, wherein the first view is generated by a resident application and the second view is generated by a phone application;
providing an input mechanism independently of the resident application and the phone application;
detecting the user performing an action on an input mechanism of the device in order to enter an input, the input being of a type that can be interpreted by either of communication application or the non-communication application, wherein each of the resident application and the phone application is operable to process input from the input mechanism independently of the other application, but for that both the resident application and the phone application concurrently display the first view and the second view; and
determining which of the resident application or the phone application is to handle the input from the action being performed on the input mechanism when the first view and the second view are displayed and a telephonic session is connected and ongoing;

wherein determining which of the resident application or the phone application to handle the input includes using a pre-established protocol or condition by which the communication application and the non-communication application are operated.

29. The method of claim 1, wherein programmatically determining whether the communication application or the non-communication application is to process the input is based on identifying a type and/or a value of the input.

30. The method of claim 1, wherein the input corresponds to one of (i) an input from a QWERTY type keyboard, or (ii) an input from an application button.

31. The method of claim 29, wherein the value of the input includes at least a letter and/or a number conveyed by the input.

32. The method of claim 29, wherein the type of the input includes a press-and-hold button.

33. The method of claim 1, wherein programmatically determining whether the communication application or the non-communication application is to process the input is based on identifying which application is in focus.

34. The method of claim 7, wherein programmatically determining whether the first application or the second application is to process the input of the input mechanism is based on identifying a type and/or value of the input.

35. The method of claim 7, wherein programmatically determining whether the first application or the second application is to process the input of the input mechanism is based on identifying which application is in focus.

* * * * *

UNITED STATES PATENT AND TRADEMARK OFFICE
CERTIFICATE OF CORRECTION

| | | |
|---|---|---|
| PATENT NO. | : 8,078,993 B2 | Page 1 of 1 |
| APPLICATION NO. | : 11/200510 | |
| DATED | : December 13, 2011 | |
| INVENTOR(S) | : Robert Haitani et al. | |

It is certified that error appears in the above-identified patent and that said Letters Patent is hereby corrected as shown below:

In column 18, line 38, in Claim 27, after "either" insert -- the --.

In column 18, line 58, in Claim 28, delete "either of" and insert -- either the --, therefor.

Signed and Sealed this
Ninth Day of October, 2012

David J. Kappos
*Director of the United States Patent and Trademark Office*